United States Patent [19]

Blankinship

[11] Patent Number: 4,530,161
[45] Date of Patent: Jul. 23, 1985

[54] CALIPER TOOL USING MAGNETOSTRICTIVE DISPLACEMENT TRANSDUCER

[75] Inventor: Thomas J. Blankinship, Ft. Worth, Tex.

[73] Assignee: Gearhart Industries Incorporated, Ft. Worth, Tex.

[21] Appl. No.: 621,057

[22] Filed: Jun. 15, 1984

[51] Int. Cl.³ .............................................. G01B 7/34
[52] U.S. Cl. ............................. 33/178 E; 33/143 L; 33/149 J; 33/178 F
[58] Field of Search ............. 33/143 L, 149 J, 148 H, 33/178 E, 148 R, 149 R, 178 F, 147 N, 147 K; 335/215

[56] References Cited

U.S. PATENT DOCUMENTS

| | | | |
|---|---|---|---|
| Re. 26,774 | 1/1970 | Tellerman | 73/386 |
| 2,102,080 | 12/1937 | Kinley | 33/178 F |
| 2,915,830 | 12/1959 | Price | 33/178 F |
| 2,933,819 | 4/1960 | Kinley | 33/178 F |
| 2,995,736 | 8/1961 | Tellerman | 340/347 |
| 3,000,101 | 9/1961 | Giardino et al. | 33/143 L |
| 3,189,849 | 6/1965 | Tellerman | 333/30 |
| 3,207,958 | 9/1965 | Chang | 335/215 |
| 3,225,312 | 12/1965 | Tellerman | 331/157 |
| 3,898,555 | 8/1975 | Tellerman | 324/34 |
| 4,298,861 | 11/1981 | Tellerman | 340/365 |
| 4,302,881 | 12/1981 | Schwind et al. | 33/178 F |

*Primary Examiner*—Willis Little
*Attorney, Agent, or Firm*—Hubbard, Thurman, Turner & Tucker

[57] ABSTRACT

A caliper tool for measuring internal dimensions of an enclosure with the tool including a housing of a size to fit within the disclosure and several feeler arms attached in a rotatable fashion to the tool housing with each feeler arm extending outwardly from the tool housing to engage the interior surface of the enclosure. A control apparatus is provided and attached to the tool housing for controlling the location of the tool housing within the enclosure. A mechanical apparatus contained within the tool housing is attached to the feeler arms and provides a translation of the rotational positions of the feeler arms into linearly displaced positions. Magnetostrictive linear displacement transducers are connected to the mechanical means to convert the linear displacement positions into electrical signals representing these positions. Interface circuitry located external to the enclosure is connected to the control apparatus and the transducer for providing input signals to and for receiving output signals from the transducer and further to display the output signals as a visible display of the internal dimensions of the enclosure.

19 Claims, 5 Drawing Figures

CALIPER TOOL USING MAGNETOSTRICTIVE DISPLACEMENT TRANSDUCER

BACKGROUND

1. Field of the Invention

This invention relates to an apparatus for measuring the internal dimensions of an enclosure and more specifically to an apparatus including one or more transducers.

2. Description of the Prior Art

In many industries such as the oil industry, it is important to determine the physical integrity of certain enclosures. In the oil industry, piping is an important conduit for the transportation of oil. The physical integrity of the pipe itself is very important. To that end, tools have been used to determine the internal physical integrity of pipes by making measurements along several locations of the internal circumference of the internal diameter of the pipe.

Problems have occurred with these types of measurement tools because of the extreme environment to which these tools are exposed within these pipes. Since, in oil wells, the pipes can be as deep as two miles, these measuring tools may be exposed to extreme heat and high pressure.

One tool, used for determining the internal diameter of a pipe along several points of circumference, includes several feeler arms attached to a housing. The feeler arms extend out from the tool housing and engage the interior surface of the pipe along several points. The tool housing is moved through the pipe along the axis of the pipe. The feeler arms are rotatably mounted within the tool housing such that the feeler arm position relative to the internal surface of the pipe is translated into a vertical up and down motion within the tool housing relative to the pipe axis. Previously, this up and down motion was used to turn a shaft connected to a potentiometer in the tool housing. Commonly, the gearing arrangement is set up such that the tool housing includes two potentiometers, one to record the maximum position of the feeler arms and the other to record the minimum position. Problems occur with the tool because these potentiometers are unable to function consistently when exposed to high pressures and high temperatures. The high temperature causes the potentiometers to drift and the high pressure can cause seals to break connecting the potentiometer shafts to the mechanical mechanisms of the feeler arms resulting in physical damage to the potentiometers.

The application of linear displacement transducers to the above problem was considered. One such linear displacement transducer is the type produced by Temposonics Incorporated and measures linear displacement by the use of magnetostriction of magnets on a linear wire combined with a pulse generator and a sensing circuit for sensing the return of the pulse resulting from the pulse interaction of the magnetic field through the wire at the point of the magnet location. Unfortunately, this linear wire expands under high temperature and will also give inconsistent readings for varied temperature environments.

The object of the present invention is to provide a caliper tool for measuring the internal integrity of an enclosure consistently through a broad temperature range.

It is a further object of the present invention to provide a magnetorestrictive displacement transducer that compensates for variations in temperature.

SUBJECT OF THE INVENTION

In accordance with the present invention, a caliper tool for measuring the internal dimensions of an enclosure is provided. The tool includes a housing sized to be placed inside the disclosure and includes several feeler arms where each feeler arm is rotatably mounted within the tool housing and extends outwardly to engage the interior surface of the enclosure. A control mechanism is attached to the tool housing to maneuver the tool housing about the interior allowing the caliper tool to make measurements at several locations. Within the tool housing, a mechanical apparatus is provided that is attached to the feeler arms to translate the rotational position of these feeler arms within the tool housing into linear displacement positions. These linear displacement positions are then converted into electrical signals by the use of a magnetostrictive linear displacement transducer attached to the mechanical means. Interface circuitry located external to the tool housing and enclosure is connected to the control apparatus and the transducer for providing input signals to actuate the transducer and for receiving the output signals from the transducer plus determining the position of the caliper tool from the control device. This interface further provides a display to the user of the internal dimensions of the enclosure at specific locations within the enclosure.

Further, in accordance with the present invention a magnetostrictive displacement transducer system is provided that includes a linear wire with several magnets located along the wire having each magnet at least partially surrounding the circumference of the wire. A pulse generator is attached to the end of the wire for transmitting a pulse to the wire in response to a control signal. A sensing circuit is attached to the wire and senses a rotation of the wire resulting from the pulse traveling down the wire and interacting with the magnetic field through the wire at the location of the magnet. The sensing circuitry produces a sense output signal as a result of this rotation which is coupled to a receiving circuit for receiving a sense pulse for each of the magnets along the wire and for producing a distance output signal indicating the distance of the magnet along the wire for each of the received sense output signals. A control circuit is also provided that initiates the pulse generator and thereafter provides the control signal in response to receiving the sense output signal from the furtherest magnet located on the wire.

In the preferred embodiment, the magnetostrictive linear displacement transducer is included in the caliper tool such that the wire and magnets are environmentally separated from the control circuitry, sensing circuitry, receiving circuitry, and pulse generation circuitry. Therefore, the only part of the transducer exposed to the extreme pressure is the magnets. The magnets are not appreciably affected by the increase in temperature, but the wire expands as a result of this increased temperature. One magnet is mounted in a fixed position at the end of the wire and is used to accurate pulse generation. Since the duty cycle of the transducer is constant and the frequency of the pulse generation is a function of temperature, the effect is a temperature compensated transducer that will be able to accurately perform in the presence of extreme temperatures in a consistent manner.

In one embodiment, the sensing circuitry includes several "divide by" counters used to separate the sense output signals for the different magnets. These divide by counters are connected to latches which store the occurrence of the sense output signals. Each latch is connected to a low pass filter circuit to provide a voltage output indicative of the distance of its respective magnet.

In a second preferred embodiment, the caliper tool includes a magnetostrictive linear displacement transducer that further includes a control circuit with a clock oscillator of a first frequency connected to a clock counter which outputs to a pulse generator circuit for generating a second frequency. In addition, the sensing circuitry includes several divide by counters, each divide by counter corresponding to a respective magnet along the linear wire. Each divide by counter is connected to a latch for storing a sense output signal from the reflective portion of the wire resulting from the pulse transmission. Each latch is connected to a counter which in turn counts a number of time intervals between its initialization signal received from the clock oscillator and the occurrence of the respective distance output signal from the sensing circuitry. The counter is in turn connected to an output latch for outputting a digital signal that represents the number of time intervals which in turn represents the respective magnets location along the wire. Also in this embodiment, the last magnet is at a fixed distance such that as the linear wire expands, the feedback signal resulting from the reception of the sense output signal from the last magnetic field interaction with the pulse resulting in the wire rotation, is used to reinitialize the pulse sequence, thus making the frequency dependent upon temperature and producing a constant duty cycle.

BRIEF DESCRIPTION OF THE DRAWINGS

The novel features which characterize the present invention are defined by the appended claims. The foregoing and other objects and advantages of the present invention will hereinafter appear, and for purposes of illustration, but not of limitation, an exemplary embodiment is shown in the drawings.

DESCRIPTION OF THE PREFERRED EMBODIMENT

The purpose of this invention is to provide a tool for determining the internal physical characteristics of an enclosure or partial enclosure. By the very nature of this problem, the tool must be one that functions in a remote environment. In other words, there is not a direct access to the internal portion of the enclosure. As previously discussed, this problem is quite common in the oil field where a bore hole pipe extends miles below the surface of the earth. In addition to being able to remotely determine the internal physical characteristics of this pipe, the tool must also withstand the harsh environment at these depth which include elevated pressure and temperature.

Figure 1:
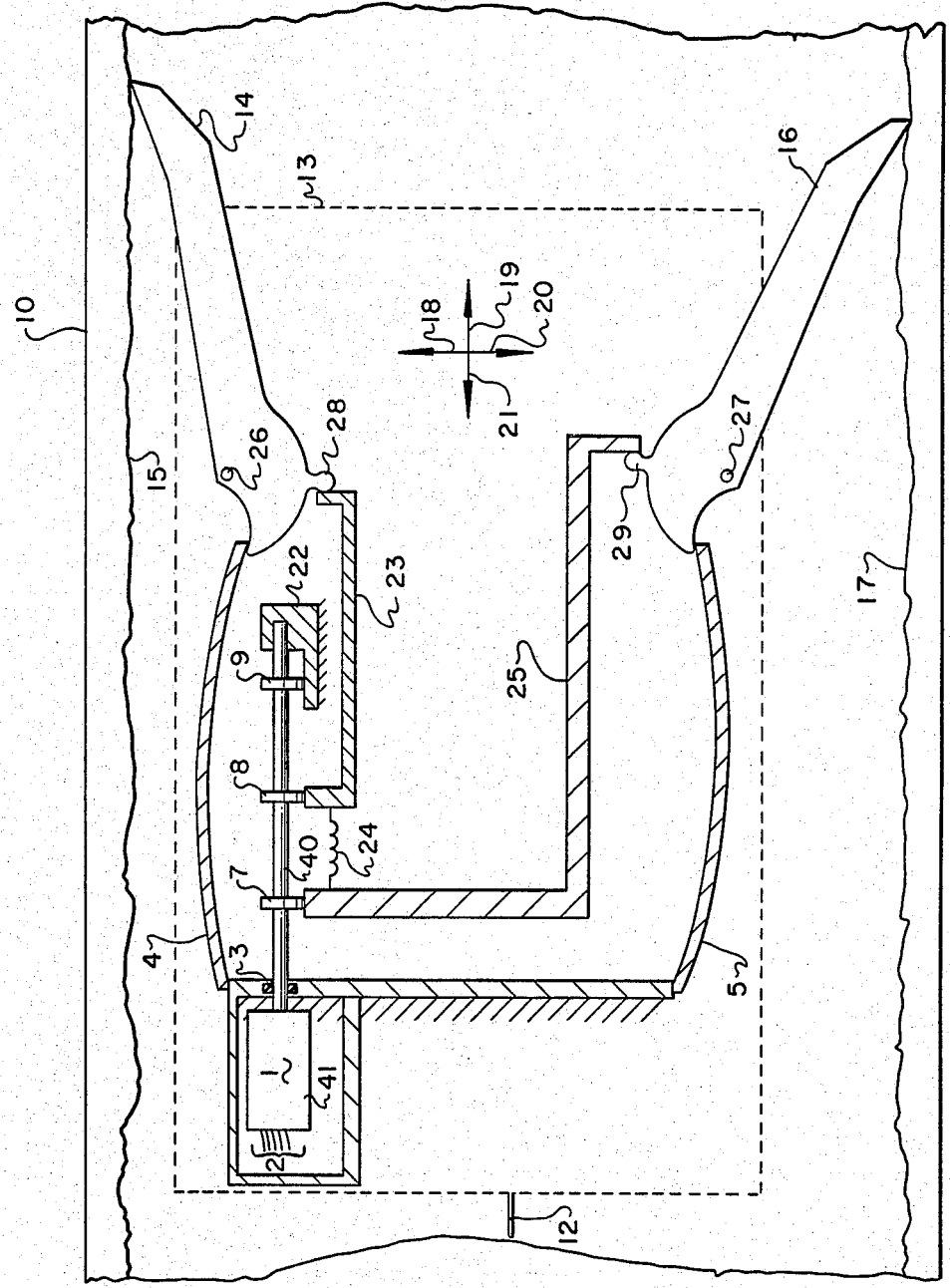
FIG. 1 is a diagram illustrating a half section of a pipe including a caliper tool inside engaging the internal pipe surfaces.

FIG. 1 illustrates the caliper tool in a housing 13 located in pipe 10 and transported through pipe 10 by cable 12 which would be connected to an external mechanism for transporting the caliper tool through pipe 10. The caliper arms 14 and 16 are held against the walls 15 and 17 of pipe 10 by leaf springs 4 and 5 as shown. Caliper arms 14 and 16 rotate about pivotal points 26 and 27 respectively to convert motion of the outside of the arms of vertical directions 18 and 20 into horizontal movements 19 and 21. Lever arms 14 and 16 include tabs 28 and 29 that rest against slides 23 and 25 respectively. Slide 23 is connected to a compression spring 24 which exerts against slide 25. Slide 23 measures the minimum diameter dimension of pipe 10 while slide 25 measures the maximum diameter dimensions. In an actual embodiment, the caliper housing 13 would contain several caliper arms such as 14 and 16 which would all be positioned to possibly contact the slides 23 and 25 such that the caliper arm measuring the minimum internal diameter dimension would have its tab (such as 28) controlling the position of slide 23 and the caliper arm that would be measuring the maximum internal diameter of pipe 10 would have a tab (such as 29) controlling the slide 25. Slides 23 and 25 are connected to magnets 7 and 8 which are connected around a rod 40 which is part of the magnetostrictive displacement transducer 1. The magnetostrictive displacement transducer 1 also includes a sensing section contained in housing 41 which is within a sealed portion of the caliper housing 13 separate from the area of magnets 7 and 8 by a seal 3. Control signals and output signals to the electronics of the magnetostrictive displacement transducer 1 are contained on wires 2. In addition to magnets 7 and 8, a third magnet 9 is provided as a reference magnet and is affixed permanently to a support 22 which also supports rod 40. Support 22 is permanently fixed to a portion of the housing 13.

Figure 2:
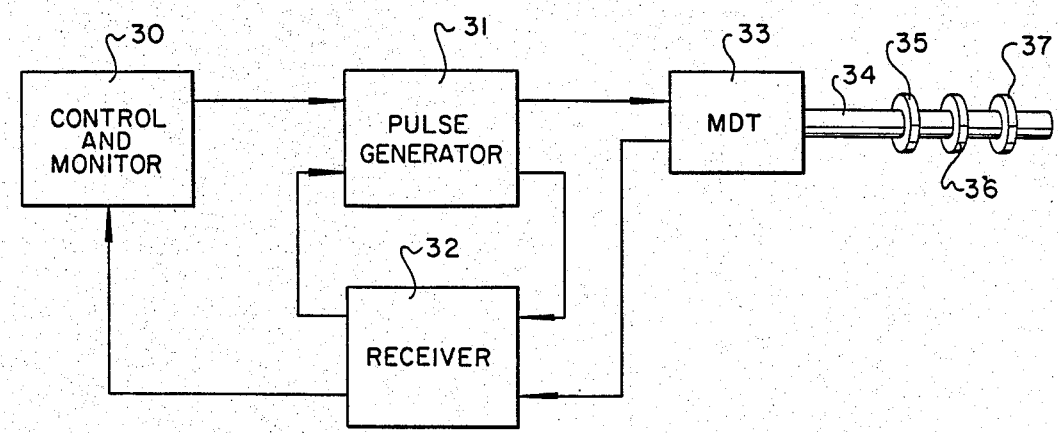
FIG. 2 is a block diagram of a magnetostrictive linear displacement transducer system.

FIG. 2 illustrates in block diagram form, the electronics contained with the caliper housing 13 that provides electrical signals representative of the positions of the feeler arms 14 and 16 in FIG. 1. The feeler arms are mechanically linked to magnets 35 and 36 as previously discussed. Magnets 35 and 36 are placed on a linear wire 34 which is connected to a magnetostrictive linear displacement transducer (MDT) 33 that is connected to a pulse generator 31, control and monitor circuit 30 and a receiver 32. The control and monitor circuitry 30 provides the initial ON signal to pulse generator 31 to initiate the reading of the location of magnets 35 and 36 respectively. Magnets 35 and 36 are respectively connected to the feeler arms 14 and 16 in a manner previously discussed. Pulse generator 31 provides a pulse to the MDT circuitry 33 which sends the pulse down line 34 and then senses the resulting rotation of line 34 at the connection to the MDT 33 circuitry. This rotation results from the pulse interaction with magnets 35, 36 and 37. Furthermore, the time between the transmission of the pulse down line 34 and the resulting rotation is indicative of the location of the respective magnets. Magnet 37 is fixed as to its relative location on line 34 and provides a constant motion return interval. Since magnet 37 is fixed on line 34, any difference in time intervals relative to the location of magnet 37 is a result of temperature changes such as increase in length of line 34 caused by the temperature increase resulting in a longer time period for the rotation return from magnet 37. The rotation of line 34 is sensed by circuitry in the MDT circuitry 33 and transmitted to receiver 32. Receiver 32 couples the resulting time intervals for magnets 35 and 36 to the control of monitor circuitry 30. The receiver 32 couples the resulting time interval for magnet 37 back to the pulse generator 31 to reinitialize the sending of the pulse to repeat this process. The fixing of magnet 37 on line 34 together with the feedback from receiver 32 to pulse generator 31 upon the occurrence of the response of magnet 37 results in a constant duty cycle for the circuitry but a frequency that is proportional to the temperature.

Figure 3:
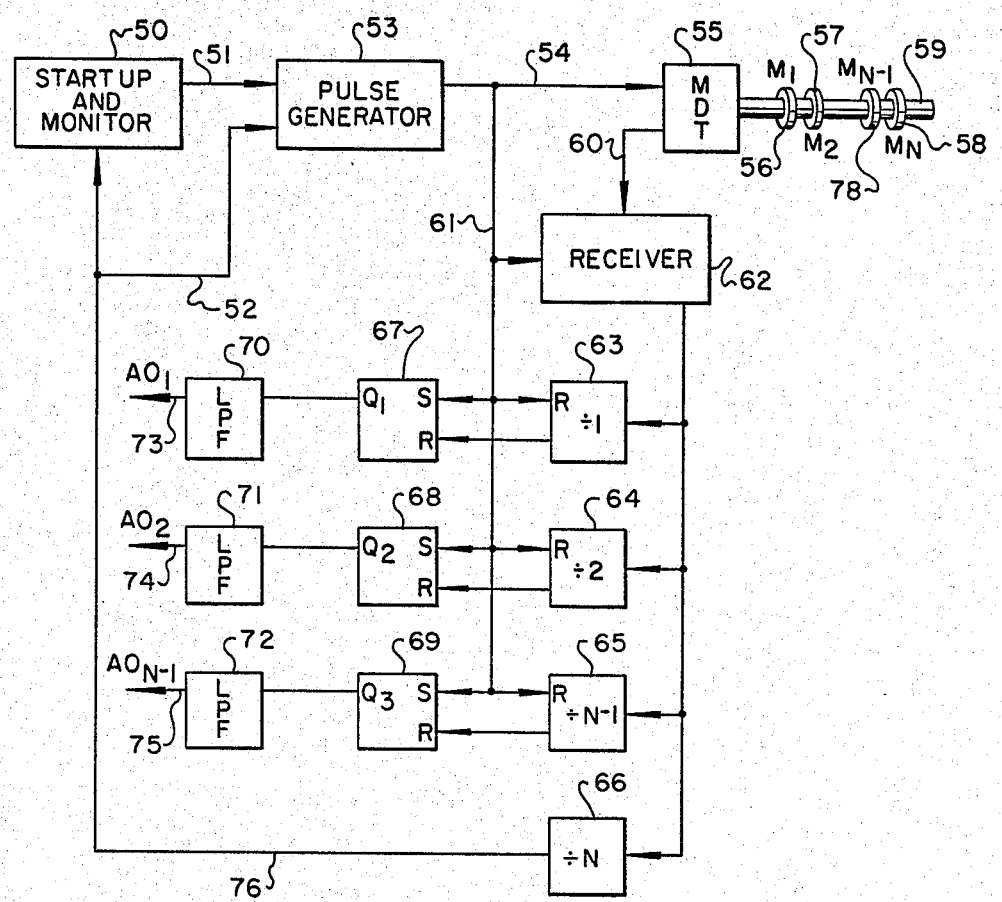
FIG. 3 is a block diagram of an analog embodiment of the invention.

FIG. 3 is another block diagram representing an analog circuit embodiment of the MDT and related circuitry. The start up and monitor circuitry 50 provides the initialization pulse to the pulse generator 51 which in turn provides the initial pulse to the MDT 55 via line 54. The pulse is then transmitted down line 59 and the rotation resulting from the interaction of the pulse with the magnets 56, 57 and 58 as previously discussed, is measured by the circuitry in 55. The output of these pulses is input through the receiver 62 via lines 60. The output of receiver 62 is then connected to a series of frequency dividing circuits 63, 64, 65 and 66 as shown. The number of frequency dividing circuits equates to the number of magnets contained on line 59. In other words, each magnet on line 59 has a corresponding frequency divider. Magnet 58 is fixed in its location on line 59 to provide the temperature compensation feedback as previously discussed. The tortion signal representing the location of magnet 58 is received by frequency divider 66 which is used to reinitiate the pulse generator 53 via line 76 and 52. The remaining of frequency dividers 63, 64, and 65 receive the signals from receiver 62 indicating the positions of magnets 56, 57, and 58 respectively. Since the operation of the frequency dividers and the related circuitry is similar for all three frequency dividers, only frequency divider 63 and circuitry will be discussed. The pulse received by frequency divider 63, indicating the location of magnet 56, is input to a flip flop 67 which stores the occurrence of the output from frequency divider 63. The output flip flop 67 is connected to a low pass filter 70 which provides a voltage output on node 73. The magnitude of this voltage on node 73 is indicative of the location of magnet 56 on line 59. Flip flop 67 is set via line 61 from pulse generator 53 each time a pulse is generated for the MDT 55. Flip flop 67 is then reset from voltage divider 63 when the signal representing the location of magnet 56 is received by receiver 62. The output que of flip flop 67 is then cyclic with the cycles varying in accordance with location of magnet 56 on line 59. This cyclic variation of the output of flip flop 67 is input to the low pass filter 70 which results in the varying voltage on node 73 representing the location of magnet 56.

Figure 4:
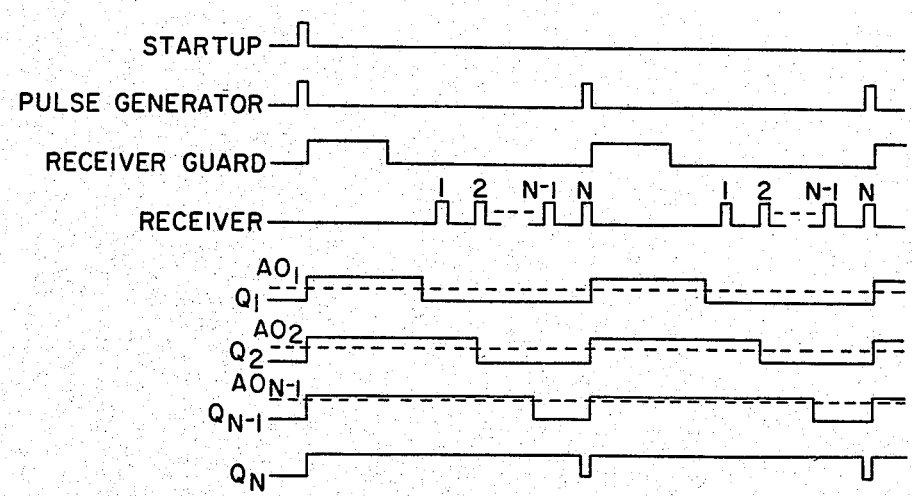
FIG. 4 is a timing diagram of a magnetostrictive linear displacement transducer system.

The timing of the circuitry in FIG. 3 is illustrated in FIG. 4. The start-up pulse is received from the start-up and monitor circuitry 50 as previously discussed. This start-up pulse results in the pulse generator 53 outputting the pulse as discussed. Receiver 62 includes a receiver guard signal that prevents any line ringing on wire 59 from being erroneously received by the frequency dividers 63 through 66. Once the receiver guard signal has dropped, after a specific time interval after the input of the pulse onto line 59, the receiver 62 outputs the occurrence of the rotation induced signals from the MDT circuitry 55. The outputs for the flip flops 67 through 69 are shown as outputs $Q_1$, $Q_2$, and $Q_{n-1}$. The output of frequency divider 66 is shown as $Q_n$. Note that on the occurrence of the pulse from the output of frequency divider 66 on line 76, pulse generator 53 outputs a new pulse on line 54 to recycle the process. Since a regeneration of this pulse is determined by the rotation signal representing the fixed location of magnet 58 on line 59, the frequency of the pulse generation is dependent on temperature but the duty cycle of the system is constant.

Figure 5:
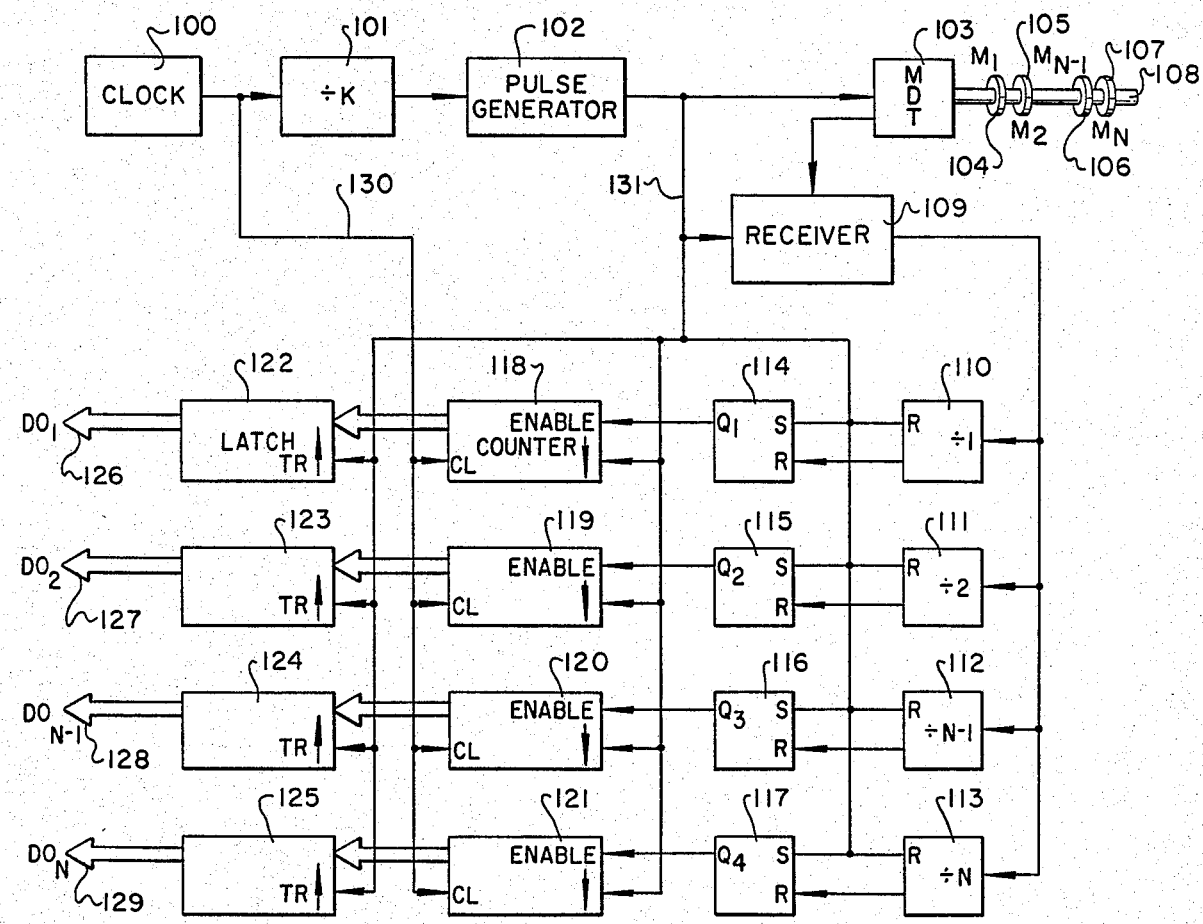
FIG. 5 is a block diagram of a digital embodiment of the invention.

FIG. 5 illustrates a digital embodiment of the invention. Clock 100 provides an input to a frequency divider 101. Frequency divider 101 is designed to output a signal to pulse generator 102 after receiving many clock pulses from 100. The greater number of clock pulses received by frequency divider 101, the greater the time resolution of the system. The output from frequency divider 101 initializes the pulse from pulse generator 102 which is transmitted to MDT 103. MDT 103 is configured with several magnets 104 through 107 positioned on wire 108 as previously discussed. The output from MDT 103 is also received by receiver 109 as before. The output of receiver 109 is coupled to several frequency divider circuits 110–113 which are in turn connected to several flip flops 114–117 as previously discussed. The workings of the circuitry to this point of the explanation is similar to that discussed in FIG. 3. However, the output of each flip flop 114 through 117 is input individually into counters 118–121. These counters 118–121 receive a clock signal from clock 100 via line 130 as shown. The purpose of counters 118–121 is to count the number of clock cycles that the output of the counters respective flip flop is high. This count in turn is output to several latches 122–125. The output of each latch is a binary number representing the number of clock intervals for the time period between the time of the pulse transmission until the reception of the rotation generated signal which is representive of the location of the magnets 104–107 on wire 108. This digital output can be used by display device to display in a digital form the location of these magnets and therefore the location of the feeler arms relative to the inside of the pipe being measured.

Although the preferred embodiments of this invention have been described here in detail, it should be understood that various changes, alterations, and substitutions may be made therein without departing from the spirit and scope of the invention as defined by the appended claims.

What is claimed:

1. A magnetostrictive displacement transducer system comprising:
   a linear wire including a plurality of magnets located along said wire, each magnet at least partially surrounding the circumference of said wire;
   a pulse generator means attached to an end of said wire for transmitting the pulse into the wire in response to a control signal;
   sensing means attached at the end of said wire for providing a sense output signal indicating a rotation of said wire at the attached end in response to said pulse interacting with the magnetic field of one of the plurality of magnets;
   receiver means for receiving the pulse from said pulse generation means and further receiving a plurality of said sense output signals, each corresponding to the distance of one of said plurality of magnets from said end and providing therefrom a plurality of distance output signals, each signal indicating a location of one of the plurality of magnets; and control means for initally providing said control signal to said pulse generation means and thereafter providing said control signal upon receiving the sense output signal from said sensing means which represents the distance of the furtherest magnet from the attached end.

2. A magnetostrictive displacement transducer system according to claim 1 wherein said sensing means further includes a pluarlity of divide by counters, each divide by counter for providing the sense output signal corresponding to the distance of one of said plurality of magnets.

3. A magnetostictive displacement transducer system according to claim 2 wherein said sensing means further including a plurality of latches, each latch connected to a respective divide by counter for storing the occurrence of said output signal.

4. A magnetostrictive displacement transducer system according to claim 3 wherein said sensing means further includes a plurality of filter circuits, each filter circuit respectively connected to a latch to provide one of said plurality of distance output signals.

5. A magnetostrictive displacement transducer system according to claim 1 wherein said control means includes a clock oscillator connected to a clock counter for outputting to said pulse generator means a first frequency signal.

6. A magnetostrictive displacement transducer system according to claim 5 wherein said sensing means includes a plurality of divide by counters, each divide by counter for providing the sense output signal corresponding to the distance of one of said plurality of magnets.

7. A magnetostrictive displacement transducer system according to claim 6 wherein said sensing means further includes a plurality of latches with each latch connected to a respective divide by counter for storing the occurrence of said sense output signal.

8. A sensing means according to claim 7 wherein said magnetostrictive displacement transducer system further includes each latch connected to a plurality of counters, each counter to count a number of time intervals between an initiating signal received from said clock oscillator and the occurrence of the respective distance output signal.

9. A magnetostrictive displacement transducer system according to claim 8 wherein said sensing means further includes a plurality of output latches, each output connected to a respective counter, said output latch for outputting a digital signal representing the respective magnet distance.

10. A caliper tool for measuring internal dimensions of an enclosure, said tool comprising:
a tool housing sized to be placed inside said enclosure;
control means attached to said housing for controlling the location of said tool housing within said enclosure;
a plurality of feeler arms, each feeler arm rotatably attached within said tool housing and extending outwardly to engage an interior surface of said enclosure;
mechanical means attached to said feeler arms for translating rotational positions of said feeler arms into linear displacement positions;
magnetostrictive linear displacement transducer means attached to said mechanical means for converting said linear displacement positions into electrical signals in response thereto;
interface means located external to said enclosure and connected to said control means and transducer for providing input signals to said transducer and receiving output signals from said transducer and for displaying said output signals as visible indicia of the internal dimensions of said enclosure.

11. A caliper tool according to claim 10 wherein said magnetostrictive linear said displacement transducer means includes a linear wire including a plurality of magnets located along said wire, each magnet at least partially surrounding the circumference of said wire;
a pulse generator means attached to an end of said wire for transmitting the pulse into the wire in response to a control signal;
sensing means attached at the end of said wire for providing a sense output signal indicating a rotation of said wire at the attached end in response to said pulse interacting with the magnetic field of one of the plurality of magnets;
receiver means for receiving the pulse from said pulse generation means and further receiving a plurality of said sense output signals, each corresponding to the distance of one of said plurality of magnets from said end and providing therefrom a plurality of distance output signals, each signal indicating a location of one of the plurality of magnets; and
control means for initially providing said control signal to said pulse generation means and thereafter providing said control signal upon receiving the sense output signal from said sensing means which represents the distance of the furtherest magnet from the attached end.

12. A magnetostrictive displacement transducer system according to claim 11 wherein said sensing means further includes a plurality of divide by counters, each divide by counter for providing the sense output signal corresponding to the distance of one of said plurality of magnets.

13. A caliper tool according to claim 12 wherein said sensing means further including a plurality of latches, each latch connected to a respective divide by counter for storing the occurrence of said output signal.

14. A caliper tool according to claim 13 wherein said sensing means further includes a plurality of filter circuits, each filter circuit respectively connected to a latch to provide one of said plurality of distance output signals.

15. A caliper tool according to claim 11 wherein said control means includes a clock oscillator connected to a clock counter for outputting to said pulse generator means a first frequency signal.

16. A caliper tool according to claim 14 wherein said sensing means includes a plurality of divide by counters, each divide by counter for providing the sense output signal corresponding to the distance of one of said plurality of magnets.

17. A caliper tool according to claim 16 wherein said sensing means further includes a plurality of latches with each latch connected to a respective divide by counter for storing the occurrence of said sense output signal.

18. A caliper tool according to claim 17 wherein said sensing means further includes each latch connected to a plurality of counters, each counter to count a number of time intervals between an initiating signal received from said clock oscillator and the occurrence of the respective distance output signal.

19. A caliper tool according to claim 18 wherein said sensing means further includes a plurality of output latches, each output connected to a respective counter, said output latch for outputting a digital signal representing the respective magnet distance.

* * * * *

UNITED STATES PATENT AND TRADEMARK OFFICE
CERTIFICATE OF CORRECTION

PATENT NO. : 4,530,161
DATED : July 23, 1985
INVENTOR(S) : Thomas J. Blankinship It is certified that error appears in the above-identified patent and that said Letters Patent is hereby corrected as shown below:

Column 7, line 16, "magnetostictive" should be --magnetostrictive--.

Column 7, line 43, "sensing means" should be --magnetostrictive displacement transducer system-- and after wherein said delete "magnetostrictive displacement transducer system".

Column 8, line 37, "magnetostrictive displacement transducer system" should be --caliper tool--.

Signed and Sealed this

Twenty-eighth Day of January 1986

[SEAL]

Attest:

DONALD J. QUIGG

Attesting Officer

Commissioner of Patents and Trademarks